United States Patent [19]

Kadokawa

[11] Patent Number: 5,414,720
[45] Date of Patent: May 9, 1995

[54] DEVICE AND METHOD USING SECOND ERROR CORRECTION CODE FOR DATA IN A RECORDING MEDIUM

[75] Inventor: Yuichi Kadokawa, Tokyo, Japan

[73] Assignee: Ricoh Company, Ltd., Tokyo, Japan

[21] Appl. No.: 786,579

[22] Filed: Nov. 1, 1991

[30] Foreign Application Priority Data

Nov. 14, 1990 [JP] Japan .................................. 2-306004

[51] Int. Cl.$^6$ .......................................... H03M 13/00
[52] U.S. Cl. .................................... 371/40.4; 371/37.1
[58] Field of Search ............... 371/40.4, 40.1, 37.1; 369/54, 58, 47

[56] References Cited

U.S. PATENT DOCUMENTS

| | | | |
|---|---|---|---|
| 4,562,577 | 12/1985 | Glover et al. | 371/40.1 |
| 4,843,484 | 6/1989 | Kanamaru et al. | 369/54 |
| 4,879,703 | 11/1989 | Kaku et al. | 369/54 |
| 5,132,956 | 7/1992 | Ichikawa | 369/54 |
| 5,142,515 | 8/1992 | McFerrin et al. | 369/32 |
| 5,159,143 | 10/1992 | Emi et al. | 369/47 |
| 5,204,847 | 4/1993 | Tayefeh | 369/58 |
| 5,241,521 | 8/1993 | Shigemori | 369/32 |

FOREIGN PATENT DOCUMENTS

| | | | |
|---|---|---|---|
| 58-177537 | 10/1983 | Japan | G11B 7/24 |
| 58-215734 | 12/1983 | Japan | G11B 7/00 |

OTHER PUBLICATIONS

English Language Abstract of Japanese Laid-Open Application No. 58-177537.

Primary Examiner—Hoa T. Nguyen
Attorney, Agent, or Firm—Cooper & Dunham

[57] ABSTRACT

A data reproduction device for reproducing a data recorded in a recording medium having a data area and an error correction area including only error correction code data. The areas are formed in the medium. The device comprises a memory device for memorizing the error correction code data of the error correction area and a control device for reading the data from the error correction area and memorizing the read data in the memory device prior to reproducing the data when the medium is installed in the reproducing device. When an error is included in a data reproduced from the data of the data area, the control device controls the reproducing device in such a way that an error correction code data corresponding to the data including the error is read from the memory device so as to correct the error of the data.

9 Claims, 4 Drawing Sheets

DEVICE AND METHOD USING SECOND ERROR CORRECTION CODE FOR DATA IN A RECORDING MEDIUM

BACKGROUND OF THE INVENTION

1. Field of the Invention

The present invention relates to a data reproduction device and a method for controlling the device which reproduces data from a recording medium having an error correction area formed therein which area includes only error correction codes for correcting data recorded in a data area.

2. Description of the Related Art

As one of applications of an optical disk, a ROM (Read Only Media) has been practically utilized which ROM is used only for reproducing data which is recorded in advance in the disk. In the field of magnet-optical disk, such a ROM is now being considered to be standardized.

A format of the ROM is arranged, to raise the reliability of the disk device, in such a way that an error correction code is added to the data recorded in the data area and that another error correction code is generated by another method for generating the code (referred to as parity code below) so that a parity area is formed in the recording medium which parity area includes only the parity code.

In the event wherein at the time of data reproducing operation, when the data error is not completely corrected by the error correction code added to the recording data, the error of the data is further corrected by the parity code corresponding to the data read from the parity area.

However, the arrangement mentioned above is involved in the following problems.

That is, at the time of data correction with the use of the parity code when reproducing the data, it becomes necessary to move the optical head for reproducing the data to the parity area where the parity code is recorded as a result of which it takes much time to access to the data.

To cope with this problem, it is proposed to prepare two optical heads arranged in such a way that one of the heads is used to access to the data area while the other head is used to access to the parity area. However, such an arrangement very complicated and bulky, which makes the disk device very expensive and impedes the realization of a compact structure of the disk device.

SUMMARY OF THE INVENTION

It is therefore an object of the present invention to provide a data reproducing device and a method for controlling the device wherein the data is reproduced from the ROM at a high speed.

The object mentioned above is achieved by a data reproduction device for reproducing a data recorded in a recording medium having a data area and an error correction area including only error correction code data, the areas being formed in the medium and the device comprising:

a memory device for memorizing the error correction code data of the error correction area; and a control device for reading the data from the error correction area and memorizing the read data in the memory device prior to reproducing the data when the medium is installed in the reproducing device, and when an error is included in a data reproduced from the data of the data area, the control device controlling the reproducing device in such a way that an error correction code data corresponding to the data including the error is read from the memory device so as to correct the error of the data.

In accordance with the structure mentioned above according to the present invention, the data in the error correction area is read and memorized in the memory means prior to reproducing the data, so that the necessary data is immediately obtained from the memory means at the time of data correction operation with the use of the data.

Therefore, an advantage of the present invention is that the data accessing time is greatly reduced due to the arrangement mentioned above.

Further objects and advantages of the present invention will be apparent from the following description of the preferred embodiments of the invention as illustrated in the accompanying drawings.

DESCRIPTION OF THE PREFERRED EMBODIMENTS

Embodiments of the present invention are described hereinafter in detail with reference to the drawings.

Figure 1:
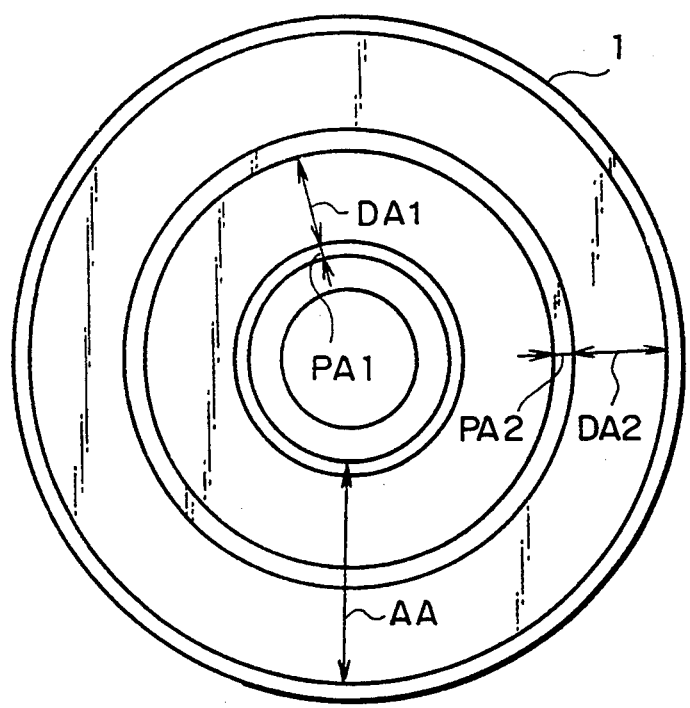
FIG. 1 is a plan view of a magnet-optical disk in accordance with an embodiment of the present invention.

FIG. 1 illustrates a magnet-optical disk in accordance with an embodiment of the present invention. The disk is used as a ROM.

The ROM 1 comprises an effective recording area AA which includes a first parity sector area PA1, a first data area DA1, a second parity sector area PA2 and a second data area DA2 formed therein being arranged from the inner side of the disk. In the data areas DA1 and DA2, data are recorded beforehand according to a predetermined format. Also, in the parity sector areas PA1 and PA2, parity data for the data areas DA1 and DA2 are recorded.

The format for the data areas DA1 and DA2 is arranged, for example, in such a way that the user data size for each one sector is 512 bytes and that an error correction code generated according to a predetermined rule for each sector is added to the sector.

Also, with respect to the parity data recorded in the parity sector areas PA1 and PA2, the data is constituted from 512 bytes forming a vertical parity having a width of 512 bytes of the user data of 512 bytes for each unit of data group made from the user data of continuous 25 sectors. An error correction code generated according to the same rule as the user data is added to the parity data.

In a manner mentioned above, the parity data recorded in the areas PA1 and PA2 correspond to the data groups of the areas DA1 and DA2, respectively.

Figure 2:
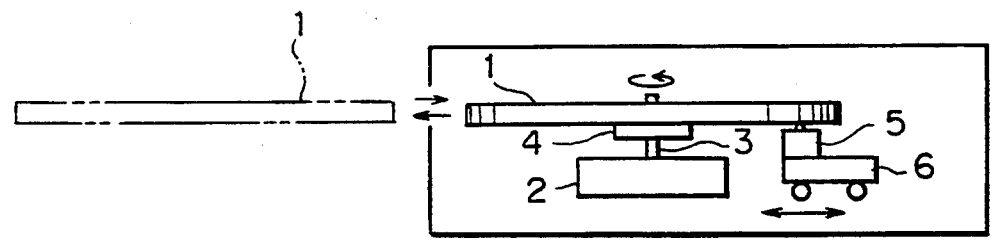
FIG. 2 is a constructional view of a magnet-optical disk device in accordance with an embodiment of the present invention.

FIG. 2 illustrates an example of the magnet-optical disk device for recording/reproducing data in the disk 1.

In the drawing, the device comprises a spindle motor 2 having a rotary axis 3 on which a turn table 4 is installed at a top thereof for mounting the magnet-optical disk 1 thereon. An optical head 5 for recording data in and reproducing data from the recording and reproducing surface of the disk 1 is mounted on a carriage 6 to which a seek motor is attached so that the head 5 is driven to move forth and back in the radial direction of the disk.

Also, the disk 1 is loaded on and unloaded from the turn table 4 by a not shown loading means.

Figure 3:
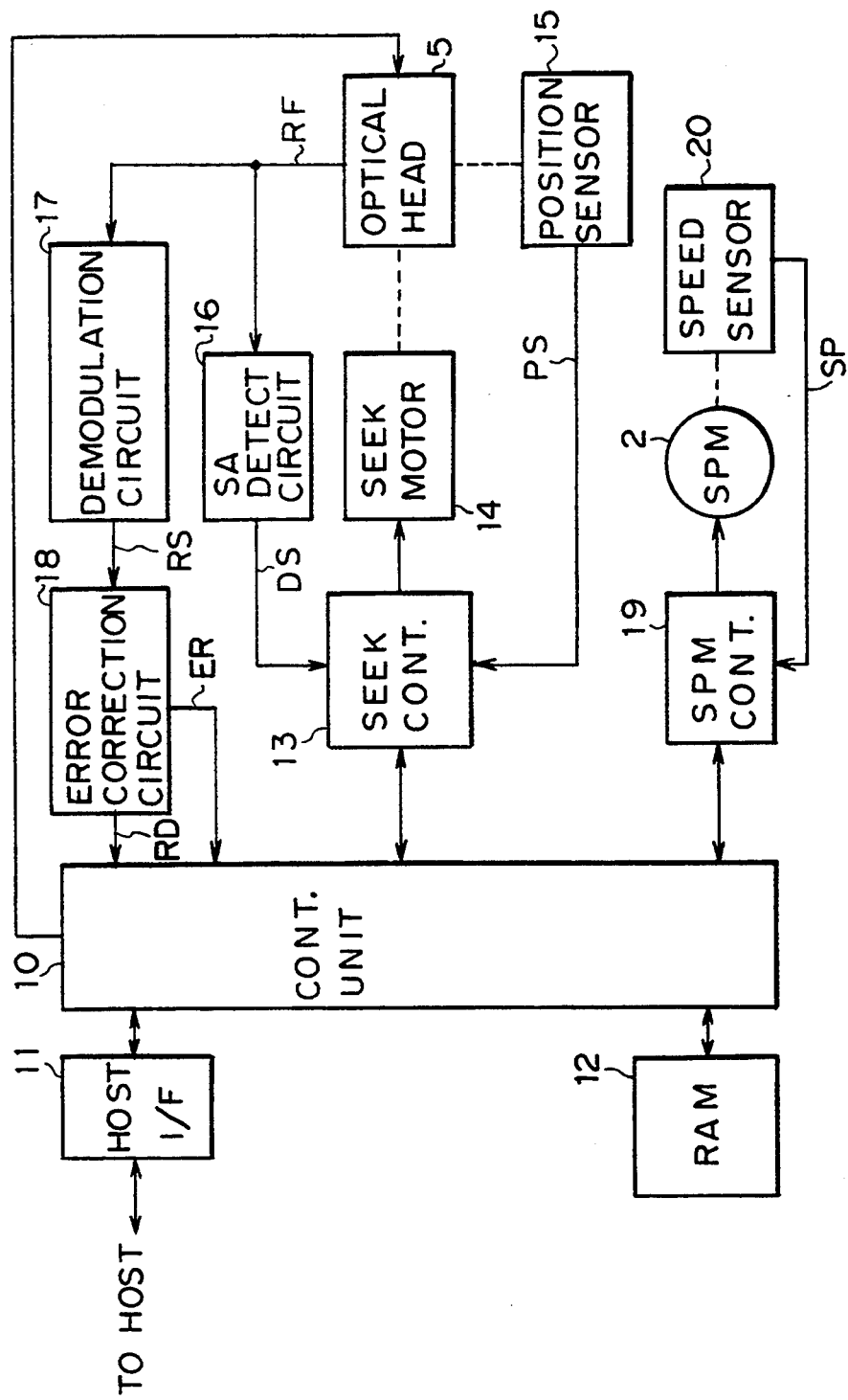
FIG. 3 is a block diagram of the data reproducing system of the device of FIG. 2.

FIG. 3 illustrates an example of the data reproduction system of the disk device of FIG. 2.

In the illustrated system, a control unit 10 controls each part of the system of this device. Also, the unit 10 transfers a predetermined data to and from a host device (not shown) such as a personal computer using the disk 1 through a host interface circuit 11.

The system also comprises a RAM (Random Access Memory) 12 for memorizing all of the parity data recorded in the area PA1 and PA2.

A seek control unit 13 is arranged for driving the seek motor 14 for driving the carriage 6 so as to move the optical head 5 to the recording track which includes an objective sector.

Also, a position sensor 15 is arranged for detecting the position of the head 5 in the radial direction of the disk 1. The detection signal PS output from the sensor 15 is transmitted to the seek control unit 13.

A sector address detection circuit 16 is arranged for detecting a sector address allotted to each sector of the effective recording area AA from the reproduction signal RF output from the head 5. The detection data DS output from the circuit 16 is transmitted to the seek control unit 13.

A demodulation circuit 17 is arranged for demodulating the reproduction signal RF to convert the signal to a reproducing signal RS of NRZ. The signal RS is transmitted to an error correction circuit 18.

The circuit 18 detects and corrects an error of data with the use of the error correction code added to each of the user data of 512 bytes for one sector represented in the reproduction signal RS. The output data corrected by the circuit 18 is transmitted to the control unit 10 as a reproduction data RD. Also, if the data error is uncorrected, an error detection signal ER is transmitted to the unit 10.

A spindle motor control unit 19 controls the rotation of the spindle motor 2. The unit 19 determines the rotary speed of the motor 2 on the basis of the detection signal SP of the speed sensor 20 for detecting the rotary speed of the motor 2.

Accordingly, the seek control unit 13 functions in such a way that the unit 13 first roughly positions the carriage 6 by driving the seek motor 14 in response to the detection signal PS from the sensor 15 so as to move the head 5 to the position corresponding to the objective sector indicated by the control unit 10 and that the circuit 16 detects the sector address discriminating frown the reproduction signal RF obtained by reproducing the data recorded in the recording track where the head is positioned. And the sector address detected by the circuit 16 is coincident with the objective address, the unit 13 stops the motion of the motor 14.

Whereas if the sector address detected by the circuit 16 is not coincide with the objective address of the sector, the unit 13 slightly and finely moves the head 5 to the position where the objective address can be detected by finely driving the seek motor 14 in response to the detected address and the objective address.

In a manner mentioned above, the unit 13 controls the seek motion of the disk device. Also, when the seek motion is ended, the unit 13 notices the end of the seek operation to the control unit 10.

On the other hand, the spindle motor control unit 19 controls the rotary speed of the motor 2 so that the detection signal value SP output from the sensor 20 becomes equal to the value indicated by the control unit 10.

Figure 4:
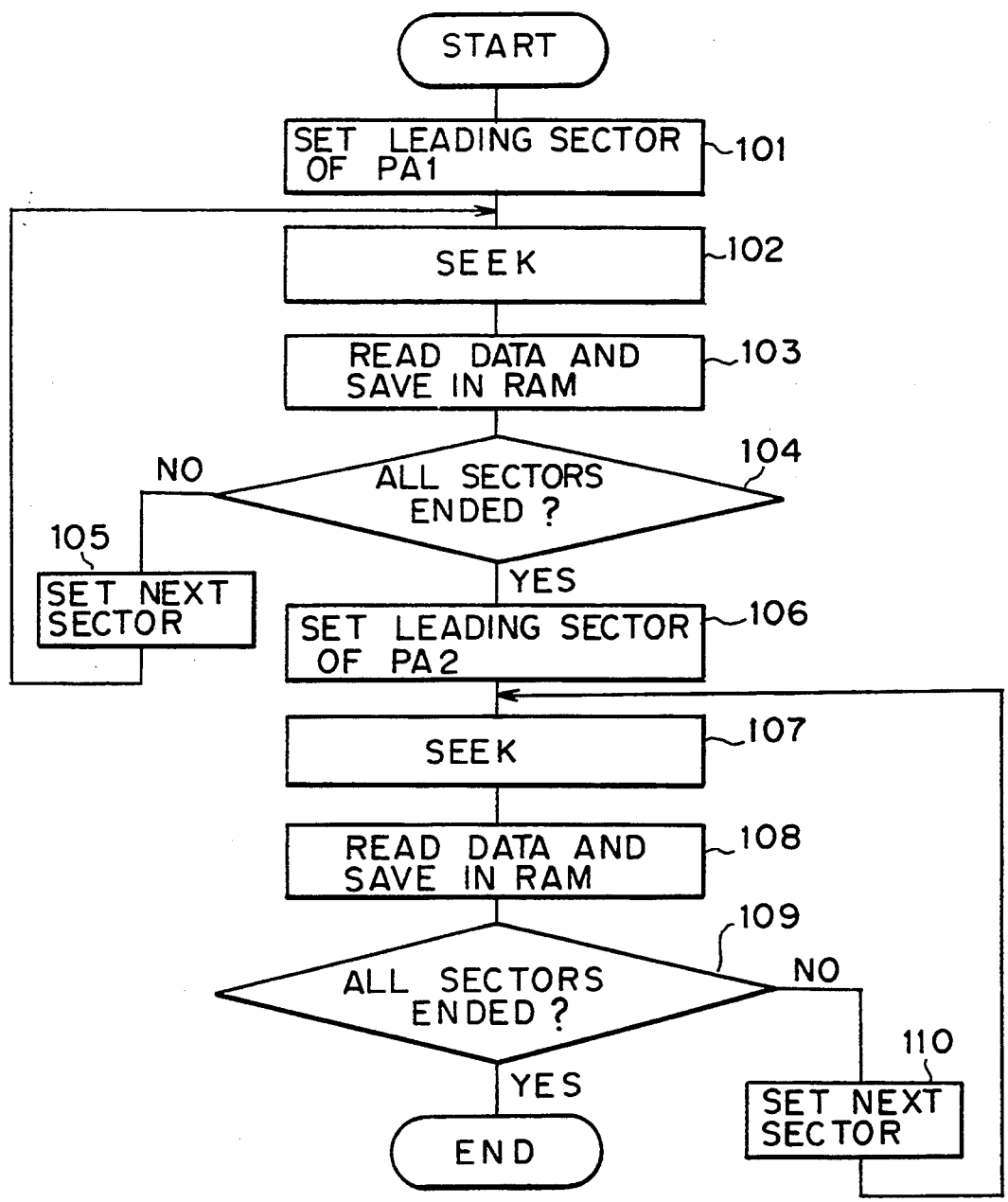
FIG. 4 is a flow chart of a process operated prior to the data reproduction function at the time when the magnet-optical disk is installed.

In accordance with the structure mentioned above, when the disk (ROM) 1 is installed in the device, the unit 10 directs the unit 19 to control the rotary speed of the motor 2 so that the motor is rotated all a predetermined speed. When the motor speed becomes the predetermined speed, the unit 10 starts the reading operation as illustrated in FIG. 4, prior to reproducing data, wherein the parity sector is read by the unit.

First, the sector address of the leading sector of the area PA1 is set in the unit 13 (step 101). In this state, the unit 13 executes the seek operation (step 102).

When the end of the seek motion is noticed to the unit 10, the unit reads the reproduction data RD of the objective sector and registers the data in the corresponding address in the RAM 12 (step 103).

In this operation, simultaneously therewith, it is checked whether all of the parity data are read from all sectors of the area PA1 or not (step 104). If the check result is YES, the sector address of the leading sector of the area PA2 is set in the unit 13 (step 106). In this state, the unit 13 executes the seek motion (step 107).

When the end of the seek motion is noticed to the unit 10, the unit reads the reproduction data of the objective sector and registers the data in the corresponding address in the RAM 12 (step 108).

In this operation, simultaneously therewith, it is checked whether all of the parity data are read from all sectors of the area PA2 or not (step 109). If the check result is NO, the sector address of the sector to be read next is set in the unit 13 (step 110). After that, the sequence moves back to the step 107 and the operation for reading the sector is executed.

If all of the parity data are read with regard to all sectors in the area PA2 so that the check result becomes YES in the step 109, the process for reading the parity sector is ended.

After that, when the host device directs to operate the data reproduction function, the unit 10 reads the data of the indicated sector one after another and transmits the data to the host device.

Figure 5:
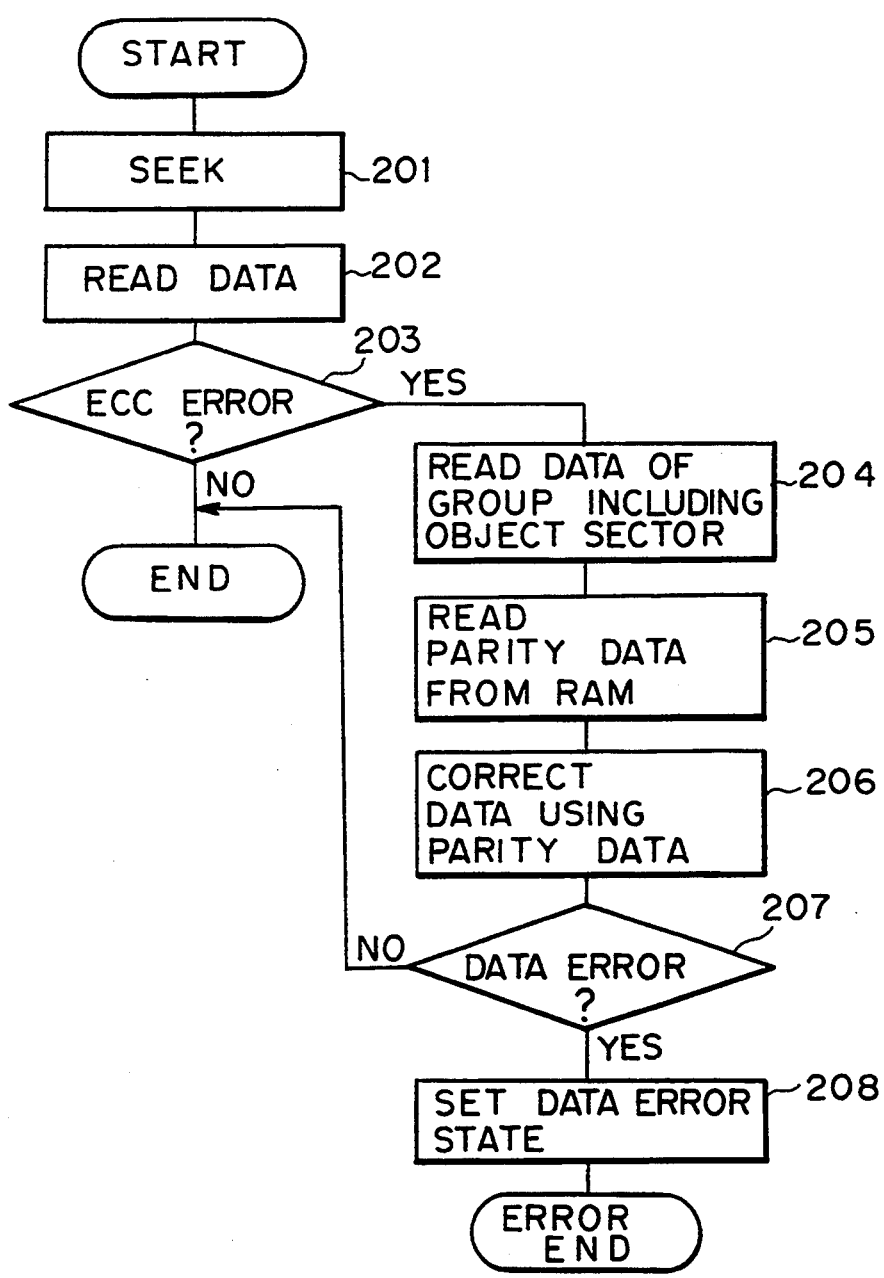
FIG. 5 is a flow chart of a process for reading data of one sector from the disk.

FIG. 5 illustrates the flow of the process for reading the data of one sector indicated as mentioned above.

First, in the state wherein the address of the indicated sector is noticed to the unit 13, the unit executes the seek operation (step 201). When the seek motion is ended, the reproduction data of the sector is read (step 202).

After that, it is checked whether the error detection signal ER is output from the circuit 18 or not (step 203). If the check result is NO, which means that the reproduction data of the sector is read without error, the process is ended.

On the other hand, if the check result is YES in the step 203, the data of 25 sectors in the data group which includes tile indicated sector as the objective sector are read one after another (step 204). Also, the parity data of the data group is read from the RAM 12 (step 205). After that, on the basis of the parity data, in accordance with a predetermined correction process, the user data of the objective sector is corrected (step 206).

After the correction step 206 mentioned above, it is checked whether the data error still remains in the user data of the objective sector or not (step 207). If the check result is NO in the step 207, the user data in which the error is corrected in the process mentioned above is determined as the user data of the objective sector and the flow of the process is ended.

On the other hand, if the check result is YES in the step 207, a data error status is set inside which status represents that the data of the objective sector includes an error (step 208). The process is ended in the state where the error is being included.

When the process is ended in the state including the error, the state that the sector includes the data error is noticed to the host device.

As mentioned above, in accordance with the embodiment of the present invention, at the time when reproducing the user data recorded in the areas DA1 and DA2, if the data error is not corrected with the use of the error correction code added to the user data, the parity data is read from the RAM 12 in which the data is registered in advance. Therefore, the data can be read immediately from the RAM at a high speed, which makes it possible to raise the access speed for obtaining the reproduction data.

It is to be noted that the magnet-optical disk device mentioned above comprises the data reproduction system directly related to the present invention. However, the present invention can be applied to the ordinary data record/reproduction magnet-optical disk device so that the data of ROM type disk can be reproduced from the ordinary device. In that case, in the state where the disk is installed in the device, a media mark, for instance, written on the disk cartridge housing the disk is read, so that the disk is discriminated as the ROM type from the read mark so that the whole process mentioned above is operated if the mark indicates that the disk housed in the cartridge is of the ROM type. On the other hand, if tile mark indicates that the disk housed in the cartridge is other than of the ROM type, the ordinary data record/reproduction process is executed.

Many widely different embodiments of the present invention may be constructed without departing from the spirit and scope of the present invention. It should be understood that the present invention is riot limited to the specific embodiments described in the specification, except as defined in the appended claims.

What is claimed is:

1. A data reproducing device for reproducing data recorded in a recording medium formed with a data area and an error correction code area, said data area recorded with data and a first error correction code, said error correction code area recorded with only a second error correction code, said device comprising:
   a reading device for reading said data and said first error correction code from said data area and for reading said second error correction code from said error correction code area, respectively;
   a memory circuit for memorizing said read second error correction code;
   a demodulating circuit for demodulating said read data;
   an error correcting circuit for detecting and correcting an error included in said demodulated data; and
   a control circuit for transmitting said read second error correction code to said memory circuit prior to demodulating the data, and for controlling said error correcting circuit in such a manner that, when an error in said demodulated data from said demodulating circuit is not corrected completely by said error correcting circuit using said first error correction code, said error correcting circuit corrects said error in said demodulated data from said demodulating circuit by using said memorized second error correction code in said memory circuit.

2. A data reproducing device for reproducing data recorded in a recording medium according to claim 1, wherein said second error correction code corresponds to data in said data area, and
   the error correction code corresponding to said data in said data area is read from said memory circuit so as to correct said error.

3. A data reproducing device according to claim 1, wherein said memory circuit comprises a RAM.

4. A data reproducing device according to claim 3, wherein said recording medium comprises an optical disc, and said reading device comprises an optical head having a laser diode.

5. A data reproducing device according to claim 1, wherein said recording medium is a read only medium.

6. A data reproducing device according to claim 1, wherein said second error correction code comprises a parity code,
   said reading device reads said parity code from said error correction code area,
   said memory circuit memorizes said read parity code, and
   said control circuit transmits said read parity code to said memory circuit prior to demodulating the data and, when an error in said demodulated data is not corrected completely by using said first error correction code, said error correcting circuit corrects said error by using said memorized parity code in said memory circuit.

7. A data reproducing device according to claim 1, wherein said error correcting circuit transmits an error status signal to said control circuit when said error is not corrected completely in said error correcting circuit by using said second error correction code.

8. A method for reproducing data recorded in a recording medium formed with a data area and an error correction area, said data area recorded with data and a first error correction code and said error correction code area recorded with only a second error correction code, said method comprising the steps of:
   reading said second error correction code from said error correction code area;
   memorizing said read second error correction code prior to reading said data;
   reading said data and said first correction code from said data area;
   demodulating said read data;
   detecting and correcting an error in said demodulated data by using said read first error correction code; and
   correcting said error by using said memorized second error correction code in said memory means, in a case where said error is not corrected completely by using said read first error correction code.

9. A method according to claim 8, further comprising a step of indicating an error status in a case where said error is not corrected completely in said correcting step by using said second error correction code.

* * * * *